United States Patent Office 3,597,320
Patented Aug. 3, 1971

3,597,320
FERMENTATIVE ACETYLATION OF STEROIDAL 3β-OLS
Stephen Kraychy, Northbrook, and Seth S. Mizuba, Morton Grove, Ill., assignors to G. D. Searle & Co., Chicago, Ill.
No Drawing. Continuation-in-part of application Ser. No. 575,246, Aug. 26, 1966. This application Dec. 11, 1968, Ser. No. 783,127
Int. Cl. C07c 167/28
U.S. Cl. 195—51                                              12 Claims

ABSTRACT OF THE DISCLOSURE

A process for acetylating steroidal 3β-ols by fermentation with Penicillium A.T.C.C. 16501 or Spicaria 20152 or 20153 is disclosed.

---

The application for Letters Patent securing the invention herein described and claimed is a continuation-in-part of the applicants' copending application Ser. No. 575,246 filed Aug. 26, 1966.

This invention relates to fermentative acetylation of steroidal 3β-ols. More particularly, this invention provides a process whereby a steroid containing a 3β-hydroxy substituent is converted to the corresponding 3β-acetoxy compound via the esterifying activity of selected species of Penicillium and Spicaria. The particular species of Penicillium and Spicaria referred to are those identified by the American Type Culture Collection code numbers 16501, 20152, and 20153, each of which the collection agency is empowered to make available at any time upon payment of their usual fee.

Contrary to what might be expected, the presence of other substituents in the steroid molecule, including but not limited to 11β and/or 17 hydroxyls, does not appear to interfere with 3-acetylation. The only known exceptions to this generalization are 11α or 7α or β hydroxyls which, inexplicably, render the process inoperable.

Typical steroidal 3β-ols adapted to the fermentative acetylation herein described and claimed are 3β-hydroxyandrost-5-en-17-one, 3β-hydroxyandrostan-17-one, 3β-hydroxypregn-5-en-20-one, androst-5-ene-3β,17-diol, 17-(lower alkyl)androst-5-ene-3β,17diol, androst-5-ene-3β-11β,17-triol, and 3-(3β,17-dihydroxyandrost-5-en-17-yl)-propionic acid and corresponding γ-lactone.

Fermentation is ordinarily carried out in a growing culture of any of the organisms above identified, to which the steroid to be esterified is added during the incubation period. Alternatively, the steroid can be incorporated in the nutrient medium prior to inoculation. A preferred but a critical range of concentrations of the steroid in the culture is 0.0025 to 0.1%.

The time required for completion of the acetylation varies widely, with fermentations of from 2 to 96 hours duration being representative.

Assimilable nitrogen and carbon should of course be present during fermentation for optimum results; and an adequate supply of sterile air should be maintained, for example by exposing a large surface of the medium to the air or by passing it through the medium in quantities sufficient to support submerged growth.

Nitrogen sources are commonly those normally employed for fermentations, including naturally-occurring organic materials such as soy bean meal, corn steep liquor, meat extract, peptone, and/or distillers solubles, as well as synthetic nitrates and/or ammonium compounds. Among the foregoing materials, meat extract and peptone serve also as carbon sources. Other carbon-containing substances suitable for, and conventionally used as, nutrients are the carbohydrates—for example, glycerol, glucose, fructose, dextrose, sucrose, lactose, maltose, dextrines starches and whey.

The 3-acetates prepared by the instant process are useful both because of their valuable pharmacological properties and the fact that they serve as intermediates to pharmacologically valuable products. Thus, for example, U.S. 3,109,850 (column 2, lines 12–19) discloses that 3β-acetoxyandrost-5-ene-11,17-diols are naturiuretic; and U.S. 3,159,622 (Example 1) discloses 3-(3β-acetoxy-17β-hydroxyandrost-5-en-17α-yl)propionic acid γ-lactone as the starting material for preparation of 3-(17β-hydroxy - 3 - oxo-6β-nitroandrost-4-en-17α-yl)propionic acid γ-lactone, which blocks the effect of desoxycorticosterone acetate on urinary sodium and potassium and inhibits cotyledonous seed germination and the growth of bacteria such as *Diplococcus pneumoniae*.

The following examples describe in detail various illustrative applications of the process of this invention. However, the invention is not to be construed as limited thereby, either in spirit or in scope, since it will be apparent to those skilled in the fermentative art that many modifications, both of materials and of techniques, may be practiced without departing from the purpose and intent of this disclosure. In the examples hereinafter set forth, temperatures are given in degrees centigrade and relative amounts of materials in parts by weight, except as otherwise noted. Specific rotations refer to the D line of sodium.

The fermentations in each of the examples hereinafter are carried out as follows: A nutrient medium consisting of 1000 parts of dextrose, 150 parts of cotton seed meal, 6 parts of concentrated hydrochloric acid, 110 parts of corn steep liquor, 5 parts of silicone anti-foam emulsion, and 25,000 parts of water is sterilized by heating to 121°, whereupon it is cooled to about 25° and then inoculated with an aqueous suspension of 7-day old spores and mycelium from a culture of the indicated organism. The medium is maintained at about 25° for approximately 24 hours, during which time a stream of sterile air is passed through and the developing culture is agitated to produce submerged growth. A solution of 10 parts of the indicated 3β-ol in approximately 200 parts of acetone is then introduced and agitation with aeration at about 25° thereupon resumed for the indicated fermentation time, at which point the mixture is extracted with dichloromethane. The dichloromethane extract is stripped of solvent and the residue worked up as described in the individual examples.

EXAMPLE 1

3β-acetoxyandrost-5-en-17β-ol. — Upon 49-hour fermentation of androst-5-ene-3β,17-diol with Penicillium sp. A.T.C.C. 16501 in accordance with the procedure described in the last paragraph preceding the examples, a residue eventuates which is chromatographed on silica gel, using benzene and ethyl acetate as developing solvents. From an eluate comprising 10% ethyl acetate in benzene, on evaporation of solvents and recrystallization of the resultant residue from acetone, 3β-acetoxyandrost-5-en-17β-ol melting at 145–147° and having a specific rotation of —66° (1% in chloroform) is obtained. The product has the formula

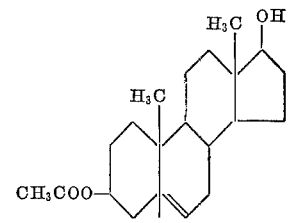

EXAMPLE 2

3β,17β-diacetoxyandrost-5-ene and 3β-acetoxy-androst-5-en-17β-ol.—Upon 72-hour fermentation of androst-5-ene-3β,17β-diol with Spicaria sp. A.T.C.C. 20152 in accordance with the procedure described in the last paragraph preceding the examples, a residue eventuates which is chromatographed on silica gel, using benzene and ethyl acetate as developing solvents. From an eluate comprising 5% ethyl acetate in benzene, on evaporation of solvents and recrystallization of the resultant residue from aqueous methanol, 3β,17β-diacetoxyandrost-5-ene melting at 147.5–156.5° is obtained. The product has the formula

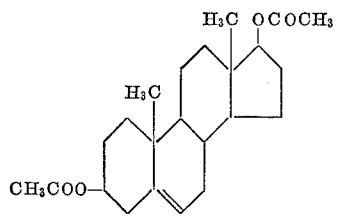

From an eluate comprising 10% ethyl acetate in benzene, on evaporation of solvents and recrystallization of the residue from aqueous methanol, 3β-acetoxyandrost-5-en-17β-ol is obtained. The product has the formula set forth in Example 1.

EXAMPLE 3

3β,17β-diacetoxyandrost-5-ene and 3β-acetoxyandrost-5-en-17β-ol.—Upon 72-hour fermentation of androst-5-ene-3β,17β-diol with Spicaria sp. A.T.C.C. 20153 in accordance with the procedure described in the last paragraph preceding the examples, a residue eventuates which is chromatographed on silica gel, using benzene and ethyl acetate as developing solvents. From an eluate comprising 5% ethyl acetate in benzene, on evaporation of solvents and recrystallization of the resultant residue from 20% hexane in ether, 3β17β-diacetoxyandrost-5-ene melting at approximately 155–161° is obtained. The product has the formula set forth in the first paragraph of Example 2.

From an eluate comprising 10% ethyl acetate in benzene, on evaporation of solvents and recrystallization of the residue from aqueous methanol, 3β-acetoxyandrost-5-en-17β-ol melting at 138–149.5° is obtained. The product has the formula set forth in Example 1.

EXAMPLE 4

3β-acetoxy-17α - methylandrost-5-en-17β-ol.—Substitution of 17α-methylandrost-5-ene-3β,17β-diol for the androst-5-ene-3β,17β-diol called for in Example 1 affords, by the procedure there set forth, 3β-acetoxy-17α-methyl-androst-5-en-17β-ol, having the formula

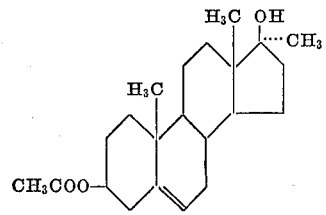

EXAMPLE 5

3β-acetoxyandrost-5-ene-11β,17β-diol. — Upon fermentation for 79½ hours of androst-5-ene-3β,11β,17β-triol with Penicillium sp. A.T.C.C. 16501 in accordance with the procedure described in the last paragraph preceding the examples, a residue eventuates which is washed with pentane and then chromatographed on silica gel, using benzene and ethyl acetate as developing solvents. From an eluate comprising 40% ethyl acetate in benzene, on evaporation of solvents and recrystallization of the residue from ethyl acetate, 3β-acetoxyandrost-5-ene-11β,17β-diol melting at approximately 155–156° and having a specific rotation of −43.5° (1% in chloroform) is obtained. The product has the formula

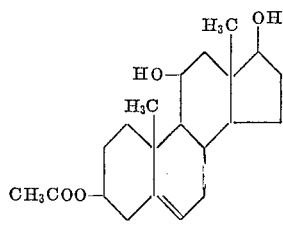

EXAMPLE 6

3 - (3β-acetoxy - 17β - hydroxyandrost - 5 - en-17α-yl)-propionic acid γ-lactone.—Substitution of 3-(3β,17β-dihydroxyandrost - 5 - en - 17α - yl)propionic acid γ-lactone for the androst-5-ene-3β,17β-diol called for in Example 1 affords, by the procedure there set forth, 3-(3β-acetoxy - 17β-hydroxyandrost-5-en-17α-yl)propionic acid γ-lactone, having the formula.

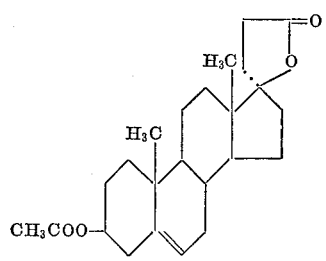

EXAMPLE 7

3-(3β - acetoxy - 17β - hydroxyandrost-5-en-17α-yl) propionic acid γ-lactone.—Upon 72-hour fermentation of 3-(3β,17β-dihydroxyandrost-5-en-17α-yl)propionic acid γ-lactone with Spicaria sp. A.T.C.C. 20152 in accordance with the procedure described in the last paragraph preceding the examples, a residue eventuates which is chromatographed on silica gel, using benzene and ethyl acetate as developing solvents. From an eluate comprising 5% ethyl acetate in benzene, on evaporation of solvents and recrystallization of the resultant residue from aqueous methanol, 3-(3β-acetoxy-17β-hydroxyandrost - 5 - en-17α-yl)propionic acid γ-lactone melting at 188.5–192° is obtained. The product has the formula set forth in Example 6.

EXAMPLE 8

3 - (3β-acetoxy - 17β - hydroxyandrost - 5 - en-17α-yl) propionic acid γ-lactone.—Substitution of Spicaria sp. A.T.C.C. 20153 for the Spicaria sp. A.T.C.C. 20152 called for in Example 7 affords, by the procedure there set forth, 3-(3β-acetoxy - 17β - hydroxyandrost-5-en-17α-yl)propionic acid γ-lactone. The product has the formula set forth in Example 6.

EXAMPLE 9

3β-acetoxyandrost - 5 - en-17-one.—Upon 24-hour fermentation of 3β-hydroxyandrost-5-en-17-one with Penicillium sp. A.T.C.C. 16501 in accordance with the procedure described in the last paragraph preceding the examples, a residue eventuates which is washed with pentane and then chromatographed on silica gel, using benzene and ethyl acetate as developing solvents. From an eluate comprising approximately 20% ethyl acetate in benzene, on evaporation of solvents and recrystallization of the residue from acetonitrile and then from ether, colorless 3β-acetoxyandrost-5-en-17-one melting at 167.5–

169.5° and having a specific rotation of −11° (1% in chloroform) is obtained. The product has the formula

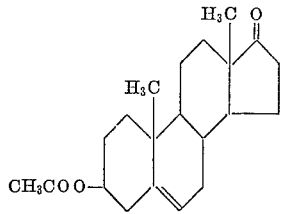

EXAMPLE 10

3β-acetoxyandrost-5-en-17-one.—Upon fermentation for 28½ hours of 3β-hydroxyandrost-5-en-17-one with Spicaria sp. A.T.C.C. 20152 in accordance with the procedure described in the last paragraph preceding the examples, a residue eventuates which is taken up in benzene. The benzene solution is chromatographed on silica gel, using benzene and ethyl acetate as developing solvents. From an eluate comprising 15% ethyl acetate in benzene, on evaporation of solvents and recrystallization of the resultant residue from a 1:5 mixture of ethyl acetate and ether, 3β-acetoxyandrost-5-en-17-one melting at 170.5—172.5° is obtained. The product has the formula set forth in Example 9.

EXAMPLE 11

3β-acetoxyandrost-5-en-17-one. — Upon 30-hour fermentation of 3β-hydroxyandrost-5-en-17-one with Spicaria sp. A.T.C.C. 20153 in accordance with the procedure described in the last paragraph preceding the examples, a residue eventuates which is washed with pentane and chromatographed on silica gel, using benzene and ethyl acetate as developing solvents. From an eluate comprising 5% ethyl acetate in benzene, on evaporation of solvents and recrystallization of the residue from a mixture of 50% hexane in ether, 3β-acetoxyandrost-5-en-17-one melting at 161–166° is obtained. The product has the formula set forth in Example 9.

EXAMPLE 12

3-β-acetoxypregn-5-en-20-one.—Upon fermentation for 22½ hours of 3β-hydroxypregn-5-en-20-one with Penicillium sp. A.T.C.C. 16501 in accordance with the procedure described in the last paragraph preceding the examples, a residue eventuates which is taken up in warm ethyl acetate. Benzene is added to the ethyl acetate solution q.s. 85%; and the resultant solution is chromatographed on silica gel, using 85% benzene in ethyl acetate as developing solvent. The eluate is stripped of solvent by vacuum distillation, and the residue is consecutively recrystallized from ethyl acetate and ethanol to give 3β-acetoxypregn-5-en-20-one melting at approximately 149.5–150.5°. The product has the formula

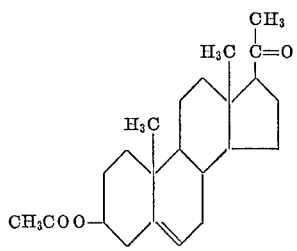

EXAMPLE 13

3β-acetoxypregn-5-en-20-one.—Upon 72-hour fermentation of 3β-hydroxypregn-5-en-20-one with Spicaria sp. A.T.C.C. 20152 in accordance with the procedure described in the last paragraph preceding the examples, a residue eventuates which is chromatographed on silica gel, using benzene and ethyl acetate as developing solvents. From an eluate comprising 5% ethyl acetate in benzene, on evaporation of solvents and recrystallization of the resultant residue from ether, 3β-acetoxypregn-5-en-20-one melting at 144.5–149.5° is obtained. The product has the formula set forth in Example 12.

EXAMPLE 14

3β-acetoxypregn-5-en-20-one.—Substitution of Spicaria sp. A.T.C.C. 20152 in accordance with the procedure decalled for in Example 13 affords, by the procedure there detailed, 3β-acetoxypregn-5-en-20-one melting at 143.5–148.5°. The product has the formula set forth in Example 12.

EXAMPLE 15

3β-acetoxy-5α-androstan-17-one.—Upon 49-hour fermentation of 3β-hydroxy-5α-androstan-17-one with Penicillium sp. A.T.C.C. 16501 in accordance with the procedure described in the last paragraph preceding the examples, a residue eventuates which is chromatographed on silica gel, using benzene and ethyl acetate as developing solvents. From an eluate comprising approximately 5% ethyl acetate in benzene, on evaporation of solvents and recrystallization of the residue from ethyl acetate, 3β-acetoxy-5α-androstan-17-one melting at approximately 100° is obtained. The product has the formula

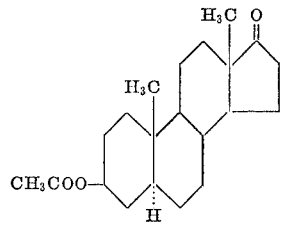

What is claimed is:

1. The process of acetylating the 3β-hydroxyl of a steroid by subjecting it to the esterifying action of an organism selected from the group consisting of Penicillium sp. A.T.C.C. 16501, Spicaria sp. A.T.C.C. 20152, and Spicaria sp. A.T.C.C. 20153, said steroid being selected from the group consisting of 3β-ols wherein neither an 11α-hydroxyl nor a 7-hydroxyl is present.

2. A process according to claim 1 wherein the organism is Pencillium sp. A.T.C.C. 16501.

3. A process according to claim 1 wherein the organism is Spicaria sp. A.T.C.C. 20152.

4. A process according to claim 1 wherein the organism is Spicaria sp. A.T.C.C. 20153.

5. A process according to claim 1 wherein the steroid is selected from the group consisting of androst-5-ene-3β,17β-diol, 17α-methylandrost-5-ene-3β,17β-diol, androst-5-ene-3β,11β,17β-triol, 3-(3β,17β-dihydroxyandrost-5-en-17α-yl)propionic acid γ-lactone, 3β-hydroxyandrost-5-en-17-one, 3β-hydroxypregn-5-en-20-one, and 3β-hydroxy-5α-androstan-17-one.

6. A process according to claim 1 in which the steroid is androst-5-ene-3β,17β-diol.

7. A process according to claim 1 in which the steroid is 17α-methylandrost-5-ene-3β,17β-diol.

8. A process according to claim 1 in which the steroid is androst-5-ene-3β,11β-17β-triol.

9. A process according to claim 1 in which the steroid is 3-(3β,17β-dihydroxyandrost-5-ene-17α-yl)propionic acid γ-lactone.

10. A process according to claim 1 in which the steroid is 3β-hydroxyandrost-5-en-17-one.

11. A process according to claim 1 in which the steroid is 3β-hydroxypregn-5-en-20-one.

12. A process according to claim 1 in which the steroid is 3β-hydroxy-5α-androstan-17-one.

References Cited

UNITED STATES PATENTS 3,431,173    3/1969    Waard et al. _____ 195—51

ALVIN E. TANENHOLTZ, Primary Examiner

PO-1050
(5/69)

UNITED STATES PATENT OFFICE
CERTIFICATE OF CORRECTION

Patent No. 3,597,320　　　　　　　Dated August 3, 1971

Inventor(s) Stephen Kraychy and Seth S. Mizuba

It is certified that error appears in the above-identified patent and that said Letters Patent are hereby corrected as shown below:

Column 1, line 54, "a critical" should be --acritical--.

Column 2, line 3, "dextrines starches" should be -- dextrines, starches --.

Column 2, formula,

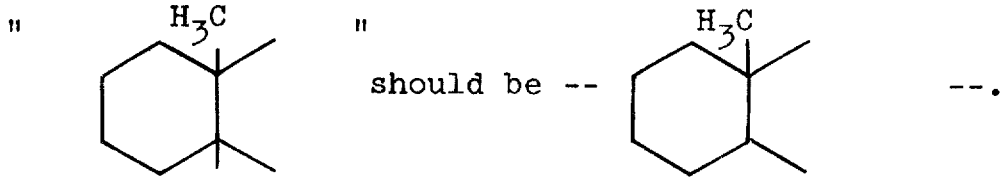

Column 3, line 2, "acetoxy-androst-" should be -- acetoxyandrost- --.

Column 3, line 39, "3β17β" should be -- 3β, 17β --.

Column 5, line 69, "de" should be -- de- --.

Column 6, lines 5-6, "20152 in accordance with the procedure de-" should be -- 20153 for the Spicaria sp. A.T.C.C. 20152 --.

Column 6, line 59, "11β-17β" should be -- 11β, 17β --.

Column 6, line 61, "5-ene-" should be -- 5-en- --.

Signed and sealed this 21st day of March 1972.

(SEAL)
Attest:

EDWARD M. FLETCHER, JR.　　　　　　　ROBERT GOTTSCHALK
Attesting Officer　　　　　　　　　　　Commissioner of Patents